United States Patent Office 3,328,422
Patented June 27, 1967

3,328,422
DERIVATIVES OF POLYHEDRAL
DODECABORANES
Walter H. Knoth, Jr., Mendenhall, Pa., assignor to E. I. du Pont de Nemours and Company, Wilmington, Del., a corporation of Delaware
No Drawing. Filed Sept. 21, 1962, Ser. No. 225,966
12 Claims. (Cl. 260—326.5)

This invention relates to new boron compounds and to processes for their preparation. More particularly, it relates to new boron compounds having a plurality of boron and hydrogen atoms and to their preparation.

Boron compounds, particularly boron hydrides, have achieved technical importance in recent years. For many potential applications most boron compounds, including boron hydrides, halides and alkyls, have been severely limited by hydrolytic, oxidative and other types of instability. To illustrate, diborane, chlorodiborane, pentaborane and trialkylboron compounds are spontaneously flammable in air. Diborane, pentaborane(9), chlorodiborane, boron trichloride, iododecaborane(14) and most other boron halides are rapidly hydrolyzed in water or alcohol. Other classes of boron compounds, e.g., the borazoles, are hydrolyzed by contact with water. Borazoles have poor thermal stability and they show reducing properties in chemical reactions, e.g., borazoles reduce silver nitrate. Even the most stable known boron hydride, i.e., decaborane(14) is hydrolyzed at a moderate rate in water. Known ionic boron hydrides, e.g., tetrahydroborates ($NaBH_4$ and the like), are similarly hydrolyzed at a rapid rate at 100° C.

This invention is directed to a broad class of boron compounds which have stability characteristics that are unusual among boron compounds. The compounds of the invention generally show hydrolytic, oxidative and chemical stabilities normally associated with aromatic compounds.

The novel compounds of the invention consist of 12 conjoined boron atoms of which at least 10 and at most 11 are bonded to hydrogen atoms, the compounds consisting further of at least one and at most two groups which are N,N-disubstituted amides of carboxylic acids, N,N-disubstituted amides of sulfonic acids, or organic sulfones, defined below in greater detail; any remaining component in said compounds being a cation, i.e., an atom or group of atoms which forms a positively charged ion in aqueous solution.

The novel compounds of the invention are obtained by heating dihydrogen dodecahydrododecaborate(−2), preferably in the form of a hydrate, with a compound which is an organic sulfone, an N,N-disubstituted carboxylic amide or an N,N-disubstituted sulfonamide defined below in greater detail, to a temperature at which hydrogen is released as a by-product, and, optionally, contacting the product so obtained with a solution containing a cation, i.e., a positively charged ion.

Description of the new compounds

The polyboron compounds of the invention are represented by the following generic formula:

$$M_{(2-n)}(B_{12}H_{12-n} \cdot nZ)_b{}^{n-2} \qquad (1)$$

where M is a cation, i.e., an atom or group of atoms which in aqueous solution can form a positively charged ion; Z is an organic sulfone, an N,N-disubstituted amide of a carboxylic acid or an N,N-disubstituted sulfonamide defined below in greater detail; $n$ is 1 or 2; $(2-n)$ represents the number of M groups which are present in the compound; $(n-2)$ represents the ionic charge or valence of the group in parentheses; $b$ has a value of at least one and is otherwise equal to the valence of M.

Inspection of generic Formula 1 shows that the polyboron compounds fall into two broad groups which are based on the values for $n$. For compounds where $n=1$, the ionic charge [represented by $(n-2)$] of the group in parentheses becomes −1 and the number of cation-forming groups (M) also becomes 1. This subgeneric group is, therefore, represented by the following formula:

$$M(B_{12}H_{11} \cdot Z)_b \qquad (2)$$

where M and Z are defined as in Formula 1 and $b$ is equal to the valence of M.

For compounds where $n=2$, the ionic charge of the group in parentheses becomes zero, i.e., the boron entity is electrically neutral and the number of groups (M) also become zero. This subgeneric group is represented by the follownig formula:

$$B_{12}H_{10} \cdot 2Z \qquad (3)$$

where Z is defined as in Formula 1.

The novel compounds of the invention have in common a characteristic boron-containing component which in Formula 2 is the portion in brackets and in Formula 3 is the entire formula. The inventive feature of the novel compounds lies in this boron-containing component. The common boron-containing unit contains 12 boron atoms which are deemed to be joined to form a skeleton-like unit or cage in which each boron atom is adjacent to at least four other boron atoms. The manner in which the boron atoms are linked is not known but the group of which the 12 boron atoms are a part functions as a unit in chemical reactions. The term "boron cage" will be used in the discussions to refer to the 12 conjoined boron atoms.

The ionic charge, represented in Formula 1 by $(n-2)$ on the boron-containing component refers to a charge which is inherent in the boron-hydrogen cage structure.

With the above discussion in mind, it can be seen from formulas for the compounds of the invention that the boron-containing group can be electrically neutral, i.e., it can have an ionic charge of zero, as in Formula 3, or it can have a charge of −1, i.e., it can be a monovalent anion, as in Formula 2.

Both boron-containing compounds (neutral and monovalent anion) have at least two characteristics in common, viz., (1) the component Z and the manner in which it is bonded to the boron-containing group, and (2) remarkable and unexpected chemical behavior which resembles in many respects the substitution reactions which aromatic compounds undergo, i.e., a chemical behavior which is best described as "aromatic."

The group Z, as defined previously, is selected from organic sulfones, N,N-disubstituted amides of carboxylic acids and N,N-disubstituted amides of sulfonic acids. These groups have, as a common property, a structure containing an atom which is capable of donating a pair of electrons to the boron cage to form a stable covalent bond.

The groups which fall within the scope of Z can be represented by the following formulas:

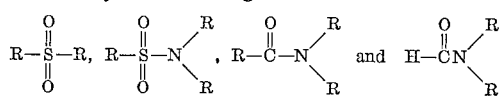

where the R groups, taken separately, represent monovalent hydrocarbon radicals which can be alike or different and which are bonded to the sulfur or nitrogen through carbon; and where two R groups, taken together, represent a divalent organic radical in which the terminal atoms are carbon, said divalent radical forming with at least one of the elements, sulfur and nitrogen, in the above formulas a ring of at most six members.

The nature of the R groups is not critical and these groups can include a wide scope of organic radicals. Thus R groups can be aliphatic, cycloaliphatic, aryl, aralkyl, alkaryl, heterocyclic or combinations of these groups. The R groups can have chains consisting solely of carbon or they can be groups having oxygen-interrupted chains. The number of carbon atoms in each of the R groups is not critical.

Solely for reasons of availability of reactants, it is preferred that the R groups be aliphatically saturated hydrocarbon groups of up to 18 carbons. In the above description, "aliphatically saturated" means free of ethylenic and acetylenic carbon-to-carbon bonds; the term includes carbocyclic aromatic compounds.

Examples of sulfones which are within the scope of $RS(O)_2R$ are as follows: dimethyl sulfone, diethyl sulfone, dioctyl sulfone, didodecyl sulfone, dioctadecyl sulfone, diisobutyl sulfone, dicyclohexyl sulfone, di[4-(cyclohexyl)cyclohexyl]sulfone, diphenyl sulfone, dinaphthyl sulfone, propyl phenyl sulfone, anthryl dodecyl sulfone, pentamethyene sulfone, 3-oxa-pentamethylene sulfone, and the like.

Examples of sulfonamides which are within the scope of the formula $RS(O)_2NR_2$ are as follows: N,N-dimethylethanesulfonamide, N,N-dibutyloctanesulfonamide, N,N-dioctadecyl-2-ethylhexanesulfonamide, N,N-dicyclohexylcyclohexanesulfonamide, N,N-dipropylbenzenesulfonamide, N,N-dibutyltoluenesulfonamide, N,N-diphenylmethanesulfonamide, N,N-diethylnaphthalenesulfonamide, N,N-di(2-ethylhexyl)-4-phenylbenzenesulfonamide, N-benzenesulfonylmorpholine, and the like.

Examples of amides of carboxylic acids which fall within the scope of the formulas $HC(O)NR_2$ and $RC(O)NR_2$ are as follows: N,N-dimethylformamide, N,N-diethylformamide, N,N-dioctylformamide, N,N-dicyclohexylformamide, N-methyl-N-dodecylformamide, N,N-dimethylacetamide, N,N-diisopropylacetamide, N,N-di(2-ethylhexyl)propionamide, N,N-didodecylcyclohexanecarboxylic amide, N,N-diphenylacetamide, N-(butyryl)morpholine, N-ethyl-N-octylbenzamide, N,N-dibenzyltoluamide, N-dicyclohexylphenylacetamide, N,N-dimethylstearamide, N-(phenylacetyl)morpholine, and the like.

Description of M

The compounds of Formulas 1 and 2 include the group M which is defined as a cation, i.e., an element or group of elements which forms a positively charged ion in aqueous solution. The group M preferably has a valence of at most 4, i.e., the valence of M is 1, 2, 3, or 4. In an especially preferred form of the invention, the valence of M is at most 3, i.e., 1, 2, or 3.

The sole function of M in the compounds of Formulas 1 and 2 is to provide a group with the necessary positive charge to combine with the boron-containing component in the event this component is a monovalent anion, as described for compounds of Formula 2. In other words, the sole purpose of M in the compounds is to provide a means for isolating the boron-containing anion. The properties of the group M are, therefore, not critical and M represents a broad range of elements or combinations of elements. To illustrate, M can be hydrogen, hydronium ($H_3O^+$), a metal, a metal-ammine complex, ammonium ($NH_4^+$), hydrazinium ($NH_2-NH_3^+$), N-substituted ammonium, N-substituted hydrazinium, S-substituted sulfonium, P-substituted phosphonium, and the like. To illustrate further, M can be lithium, sodium, cesium, beryllium, barium, magnesium, calcium, strontium, lanthanum, manganese, iron, cobalt, copper, zinc, mercury, aluminum, thallium, tin, lead, silver or any other metal. As further illustrations, M can be $R'NH_3^+$, $R'_2NH_2^+$, $R'_3NH^+$, $R'_4N^+$, $(R'NH-NH_3)^+$, $(R'_2N-NH_3)^+$, $R'_3S^+$, $R'_4P^+$,

$[Cu(NH_2CH_2CH_2NH_2)_2]^{++}$, and the like. The substituents represented by R' in the above illustrations are organic groups whose character or nature is not a critical feature of these cation groups. The substituents represented by R' can be open-chain or closed-chain, saturated or unsaturated or the substituents can be composed of heterocyclic rings of which the nitrogen is a component, e.g., pyridine, quinoline, morpholine, hexamethylenimine, and the like. Preferably, R' (for reasons of availability of reactants) is a hydrocarbon group of at most 18 carbons.

Nomenclature

No official system of naming boron compounds has been adopted at the present time. The nomenclature used herein follows the proposals made by a group of the Committee on Nomenclature of the American Chemical Society Division of Organic Chemistry. These proposals are discussed in (1) a paper presented by G. W. Schaeffer at the American Chemical Society Meeting, San Francisco, California, April 13–18 (1958), (2) a paper presented by K. L. Loening to the Division of Chemical Literature, American Chemical Society Meeting, Chicago, Illinois, September 7–12 (1958), and (3) a publication by Patterson, Chemical Engineering News 34, 560 (1956). The nomenclature is also in accordance with the system published in "Nomenclature of Inorganic Chemistry—1957," p. 72, International Union of Pure and Applied Chemistry, Butterworths Scientific Publications (London), 1959.

Names assigned to non-ionic boron compounds end in "ane" with the number of hydrogens bonded to boron in the parent compound shown in parentheses, e.g., $B_{10}H_{14}$ is tetradecahydrodecaborane(14) or, simply, decaborane (14), $B_{12}H_{10} \cdot 2CH_3C(O)N(CH_3)_2$ is bis(N,N-dimethylacetamido)decahydrododecarborane(10) or, more simply, bis(N,N-dimethylacetamido)dodecaborane(10). Names assigned to ionic boron compounds end in "ate" with the valence of the boron-containing ion designated in parentheses by numeral and charge sign. Thus, $$NH_2NH_3B_{12}H_{11} \cdot O_2S(CH_3)_2$$

is hydrazinium dimethylsulfone-undecahydrododecaborate (−1).

The terms for the captions "hydrogen" and "hydronium" are employed herein as defined on page 26 of "Nomenclature of Inorganic Chemistry—1957," which was referred to earlier.

Properties and characteristics of the new compounds

In physical properties the new compounds range from low melting products to high melting salt-like materials which are stable at conventional atmospheric temperatures and pressures. The products are normally colorless or white and they are usually crystalline. However, color and other physical characteristics are determined to some degree by the components M and Z.

Many of the compounds dissolve to some extent in water or hydroxylated solvents, e.g., alcohols, and to a more limited extent in ethers, e.g., tetrahydrofuran. The compounds fall into two groups in their behavior in water. The compounds of Formula 2 are ionic in character, i.e., they behave like salts and form ions in solution. The compounds of Formula 3 are neutral and non-ionic, i.e., they are not salt-like in character and they do not form ions. The ionic group of components generally show greater solubility in water than the non-ionic group of compounds and this difference in solubility is used to effect separation and purification of the groups.

The compounds of the invention are unusually stable thermally and chemically. They are stable, for example, in the presence of aqueous solutions of inorganic acids, a property which is unusual for boron compounds. The compounds undergo electrophilic substitution reactions in a manner resembling carbocyclic aromatic compounds to form a wide range of substituted products. This unusual behavior will be discussed more fully in paragraphs following the examples.

Examples of representative compounds are given below solely to illustrate the invention and they are not to be considered as limiting the scope of operable compounds:

B₁₂H₁₀·2HC(O)N(CH₃)₂
B₁₂H₁₀·2HC(O)N(C₃H₇)₂
B₁₂H₁₀·2HC(O)N(C₆H₁₁)₂
B₁₂H₁₀·2HC(O)N(C₂H₅)(C₆H₅)
B₁₂H₁₀·2CH₃C(O)N(CH₃)₂
B₁₂H₁₀·2CH₃C(O)N(C₄H₉)₂
B₁₂H₁₀·2C₃H₇C(O)N(C₁₂H₂₅)₂
B₁₂H₁₀·2C₆H₁₃C(O)N(C₁₈H₃₇)₂

B₁₂H₁₀·2C₆H₅C(O)NCH₂CH₂OCH₂CH₂
B₁₂H₁₀·2C₂H₅C(O)N(CH₃)(C₆H₅)
B₁₂H₁₀·2C₆H₅C(O)N(C₆H₅)₂
B₁₂H₁₀·2O₂S(CH₃)₂
B₁₂H₁₀·2O₂S(C₄H₉)₂
B₁₂H₁₀·2O₂S(C₁₂H₂₅)₂

B₁₂H₁₀·2O₂S—CH₂(CH₂)₂CH₂
B₁₂H₁₀·2O₂S(C₆H₅)₂
B₁₂H₁₀·2O₂S(CH₃)(C₆H₅)
B₁₂H₁₀·2C₄H₉SO₂N(C₂H₅)₂
B₁₂H₁₀·2C₁₂H₂₅S(O)₂N(C₂H₅)₂
B₁₂H₁₀·2C₆H₅SO₂N(C₃H₇)₂
B₁₂H₁₀·2CH₃C₆H₄SO₂N(C₁₈H₃₇)₂

B₁₂H₁₀·2C₂H₅S(O)₂NCH₂CH₂OCH₂CH₂
B₁₂H₁₀·2C₁₀H₇SO₂N(CH₃)₂ and the like. Further examples, particularly of compounds of Formula 2 are as follows:

LiB₁₂H₁₁·HC(O)N(CH₃)₂
CsB₁₂H₁₁·HC(O)N(C₄H₉)₂
AgB₁₂H₁₁·HC(O)N(C₂H₅)₂

(CH₃)₃SB₁₂H₁₁·HC(O)NCH₂CH₂OCH₂CH₂
NH₂NH₃B₁₂H₁₁·HC(O)N(C₃H₇)₂
NaB₁₂H₁₁·CH₃C(O)N(CH₃)₂
Ba[B₁₂H₁₁·C₃H₇C(O)N(C₂H₅)₂]₂
Mg[B₁₂H₁₁·C₁₁H₂₃C(O)N(C₂H₅)₂]₂
NH₄B₁₂H₁₁·CH₃C(O)N(CH₃)₂
NH₂NH₃B₁₂H₁₁·CH₃C(O)N(C₆H₅)₂
C₄H₉NH₃B₁₂H₁₁·CH₃C(O)N(CH₃)₂
Ca[B₁₂H₁₁·O₂S(C₂H₅)₂]₂
Pb[B₁₂H₁₁·O₂S(C₆H₅)₂]₂
NH₄B₁₂H₁₁·O₂S(C₆H₁₁)₂

NH₂NH₃B₁₂H₁₁·O₂SCH₂(CH₂)₂CH₂
Zn(NH₃)₄[B₁₂H₁₁·O₂S(C₄H₉)₂]₂
Co(H₂O)₆[B₁₂H₁₁·O₂S(C₆H₁₁)₂]₂

(CH₃)₃SB₁₂H₁₁·O₂SCH₂(CH₂)₂CH₂
Sr[B₁₂H₁₁·C₆H₅SO₂N(C₂H₅)₂]₂
LiB₁₂H₁₁·C₄H₉SO₂N(C₆H₁₃)₂
NH₂NH₃B₁₂H₁₁·CH₃C₆H₄SO₂N(C₂H₅)₂
NH₄B₁₂H₁₁·C₄H₉SO₂N(CH₃)(C₆H₅)
(CH₃)₃SB₁₂H₁₁·C₈H₁₇SO₂N(C₂H₅)₂
(CH₃)₄PB₁₂H₁₁·C₆H₅SO₂N(C₂H₅)₂
(C₆H₅N₂)B₁₂H₁₁·CH₃C₆H₄SO₂N(CH₃)₂ and the like.

*The process*

The compounds are obtained by employing as reactants (1) dihydrogen dodecahydrododecaborate(—2), preferably in the form of its hydrates, i.e., $$(H_3O)_2B_{12}H_{12} \cdot nH_2O$$

where $n$ can have a value up to 18 or even higher, (2) a sulfone, an amide of a carboxylic acid or a sulfonamide which are represented by the formulas $RS(O)_2R$, $$RC(O)NR_2$$

$HC(O)NR_2$ and $RS(O)_2NR_2$, wherein R is defined as described in a previous paragraph and, optionally, (3) a salt having the cation M. In the operation of the process, the reactant defined in (2) appears in toto in the final product as component Z, and the discussion given earlier for the Z groups applies in full to these reactants.

The dodecahydrododecaborate(—2) reactant can be prepared in situ, if desired, from a strong inorganic acid and a salt of the dodecahydrododecaborate(—2) anion. The dodecahydrododecaborate(—2) salts or the free acid are not readily available compounds and their preparation is described later in the examples.

The sulfones, amides or carboxylic acids and sulfonamides are well known and usually readily available materials. In the event they are not obtainable directly, the reactants can be prepared by conventional methods of organic chemistry.

The process is performed most conveniently and simply by contacting the boron-containing acid (or its precursors) and the Z reactant at a temperature sufficient to release hydrogen and, optionally, contacting the resulting product with a salt having a cation M, where M is defined as in Formula 1.

As noted above, precursors of the hydrogen dodecahydrododecaborate(—2) can be used. The precursors are a strong mineral acid, e.g., concentrated aqueous solutions of HCl, H₃PO₄, and the like, and a dodecahydrododecaborate(—2) of the formula $M_a(B_{12}H_{12})_b$, where M is a cation as defined in Formula 1 and $a$ and $b$ are the smallest positive whole numbers which satisfy the equation $$b = \frac{a \times \text{valence of } M}{2}$$

The temperature to which the reaction mixture is heated to effect release of hydrogen is determined to some extent by the reactivity and physical properties of the components and by other conditions of operation, for example, pressure. The point at which onset of hydrogen evolution occurs is easily observed by the rapid formation of bubbles of gas in the mixture. In the initial phases of the reaction, water of hydration or adventitious moisture, if present, is removed after which evolution of hydrogen begins. In some instances, particularly for high boiling sulfones and sulfonamides, temperatures as low as 40° C. are sufficient. Temperatures up to 300° C., or higher can be used if necessary. In general, a temperature between about 50° C. and about 250° C. is sufficient for satisfactory operation.

The process can be conducted in a batch or continuous operation. In a batch process the reactants can be mixed initially at prevailing atmospheric temperature, if desired, and the mixture can be heated to the temperature at which hydrogen is released. In a continuous process the reactants can be fed into a vessel at the desired temperature and the reaction products can be removed continuously. The manner of operation, whether batch or continuous, is not a critical factor in the process.

The process can be operated at atmospheric pressure or at pressures which are higher or lower than atmospheric. Pressure can be used as a means of maintaining relatively low boiling reactants in mutual contact within the reaction zone, particularly when the rate of reaction is slow and a high temperature is desirable to effect release of hydrogen at a practical rate. Pressures below atmospheric can be employed when the reactants are high boiling and, consequently, do not volatilize at the low pressures. Atmospheric pressure is most conveniently employed for reactants which boil sufficiently high to remain in the reaction zone at the temperature of operation. Thus, the pressure at which the process is operated is a matter of convenience, based principally on the boiling points and volatility of the reactants. Pressure is not a critical factor in the process.

The mechanism of the reaction is not clearly established but it is evident from an inspection of the formulas of the reactants and the final products that one mole of hydrogen is released per mole of H₂B₁₂H₁₂ acid to obtain the compounds of Formula 2 and two moles of hydrogen are released per mole of H₂B₁₂H₁₂ acid to obtain compounds of Formula 3.

The mole ratio in which the reactants are used is not critical. Preferably, for maximum yield of desired products, the ratio of moles of Z compound to moles of dodecahydrododecaborate compound is at least 1 and it can be as high as 10 or even higher. In an especially preferred method of operation to obtain compounds of both Formulas 2 and 3, the mole ratio defined above is at least 2, i.e., it is preferable to use an excess of the Z reactant to assure maximum utilization of the boron-containing reactant.

In the operation of the process, a reaction vessel is used whose inner surfaces are made of corrosion-resistant material, i.e., commercially available stainless steels, platinum, glass, and the like. Conventional vessels or pressure-resistant vessels can be employed.

The order in which the reactants are charged into the reaction vessel is not critical. Pressure in the vessel can be reduced to a low value, if desired, by conventional methods and heating of the reactants can be accomplished by any suitable means.

Mixing of the reactants during the operation of the process is desirable although not essential. Mixing can be accomplished by any suitable means, e.g., by mechanical stirring, shaking, and the like.

The time for completion of the reaction is not critical. In a batch process the time will generally lie between about 15 minutes and about 50 hours. In general, a reaction time of about 1–25 hours is sufficient for a batch operation. For a continuous process, much shorter reaction times can be used and unreacted components can be recirculated for further exposure in the reaction zone.

In an optional method of operation of the process, the reaction can be conducted in the presence of an inert solvent, i.e., a liquid which is not decomposed under the conditions of the reaction by the components of the process or by the products which are obtained. In many cases the Z component is a liquid at the temperature of the reaction and it can serve both as a solvent and reactant. The use of a solvent is not essential for operability and its use is based solely on convenience of operation. Solvents, in the event they are employed, are preferably liquids at the operating temperatures and they are, in most cases, liquids at prevailing atmospheric temperatures. Hydrocarbons are particularly useful as solvents for processes operating at atmospheric pressure, e.g., toluene, dodecane, and the like.

In the operation of the process, suitable provision should be made for disposition of the volatile by-products in view of their possible flammability or toxicity.

The crude product which remains in the reaction vessel after removal of volatile by-products is usually a syrup or pasty mass. It is processed by mixing with a hydroxylated compound, e.g., water, alcohol, and the like. Water is the preferred medium for processing the crude product. The non-ionic compounds of Formula 3 usually precipitate at this stage and they are separated by appropriate means, e.g., decantation or filtration.

The liquid portion remaining after separation of the non-ionic compound contains the ionic products of Formula 2. These products are isolated by contacting the solution with a salt having a cation M which forms a compound of Formula 1 of low solubility, e.g., a cesium salt or a tetra(lower alkyl)ammonium salt. These salts can be used as intermediate products for the preparation of a wide range of compounds of Formula 2 as described in the following paragraphs.

*Metathetic reactions*

Compounds of Formula 2 wherein M covers a wide range of cations are obtained by simple metathetic reactions employing, e.g., the cesium or tetraalkylammonium salts which are readily obtained by the processes described earlier. To illustrate, an aqueous solution of a compound of Formula 2 where M is Cs is contacted with a strong acid or with a strongly acidic ion-exchange resin to obtain the free acid, i.e., a compound of Formula 2 in which M is hydrogen or hydronium. The acid, generally in solution, is reacted with oxides of metals, hydroxides of metals, salts of metals (both organic and inorganic), nitrogen bases, sulfonium hydroxides or halides, phosphonium hydroxides or halides, aryldiazonium hydroxides or halides and similar types of compounds to obtain compounds of Formula 2 which have the desired cation M. In a process employing an ion-exchange resin, strongly acidic resins of the crosslinked polystyrene-sulfonic acid variety are preferred because of availability of these resins in commercial markets. The acid, so obtained in aqueous solution, can be reacted with nitrates, chlorides, bromides, acetates, benzoates and similar salts of metals or other bases to obtain salts of Formula 2.

Compounds of Formula 2 where M is an alkali or alkaline earth metal, e.g., Li, Na, K, Cs, Ca, Ba, Mg and Sr are especially useful in simple metathetic reactions with other salts to effect an exchange of cations. Thus, $NaB_{12}H_{11} \cdot Z$, where Z is defined as Formula 1 or 2, can be reacted in appropriate solvents with ammonium sulfate, benzenediazonium hydroxide, pyridinium chloride, morpholinium sulfate, poly(ethylenimine)hydrochloride, and the like to form componds of Formula 2 having ammonium, benzenediazonium, pyridinium, morpholinium, poly(ethyleniminium), and the like cations. These illustrations are not limiting and they demonstrate the breadth of metathetic reactions which can be used.

Compounds of the invention wherein M is a hydrogen ion are usually obtained as hydrates wherein the water is bound most closely with the proton to form hydronium ions.

Compounds of the invention in which the group M is a metal, particularly a transition metal, or a Werner-type complex also frequently contain solvent of crystallization when isolated by conventional methods. The solvent can be bound loosely in the lattices of the crystals or it can be associated by stronger bonds with the metal cation or Werner-type complex cation. Solvent of crystallization, e.g., water, entrapped in crystal latices, is removed easily by well known procedures, e.g., by heating under reduced pressure. Solvent of crystallization which is associated with the cation is more difficult to remove, and for most applications, it is not necessary to remove completely this type of bound solvent.

The products of the invention and processes for obtaining them are illustrated in the following examples. Infrared absorption spectra are determined on mulls of the compounds in mineral oil.

EXAMPLE A

A. A pressure vessel (capacity, 400 ml.) is charged with 19.0 g. of $NaBH_4$ and 75 ml. of dry triethylamine. The vessel is cooled in a solid carbon dioxide-acetone bath and the internal pressure is reduced to less than 1.0 mm. pressure by means of a vacuum pump. Diborane (36.0 g.) is introduced into the vessel which is then closed. The mixture is heated with agitation for 10 hours at 180° C. After cooling the vessel and venting to remove volatile products, there remains a solid residue which is washed from the vessel with glyme (1,2-dimethoxyethane). The solid is separated by filtration and it is again washed with glyme. The washed solid is dissolved in hot tetrahydrofuran and the solution is filtered to remove a small quantity of insoluble product. The filtrate is heated to boiling and glyme is added slowly until solid material begins to separate. The mixture is chilled and it is then filtered to separate the white crystals. These crystals are washed with glyme and dried at less than 0.001 mm. pressure at 90–100° C. to yield 43.9 g. of $Na_2B_{12}H_{12}$ containing glyme and water of solvation. Further treatment of the filtrate yields an additional 5.4 g. of the product.

The compounds can be obtained as its hydrate free of ether of solvation by dissolving the product in water and evaporating the solution to dryness. The product so obtained has the formula $Na_2B_{12}H_{12} \cdot H_2O$.

EXAMPLE B

An aqueous solution containing 0.43 g. of $Na_2B_{12}H_{12} \cdot H_2O$ is passed through a 0.5″ diameter chromatography column containing 80 ml. of an acid ion-exchange resin of the crosslinked polystyrenesulfonic acid type. The strongly acid effluent from the column is evaporated to remove all materials volatile at less than 0.001 mm. at 45° C. There remains 0.38 g. of a white, crystalline, very hygroscopic solid which is a hydrate of dihydrogen dodecahydrodo-decaborate(−2).

EXAMPLE 1

(A) A mixture is prepared consisting of 20 g. of the dihydrate of $Na_2B_{12}H_{12}$, 150 ml. of N-methyl-2-pyrrolidone and 25 ml. of concentrated hydrochloric acid. The mixture is stirred and filtered to remove insoluble material. The clear filtrate is charged into a distillation unit and it is heated to boiling with removal of volatile material until the liquid temperature reaches 207° C. The solution is refluxed at this temperature for about 2 hours. It is cooled to atmospheric temperature and poured into 600 ml. of water. The solid product which forms is separated by filtration to obtain 5.3 g. of crude

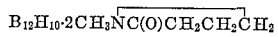
$$B_{12}H_{10} \cdot 2CH_3NC(O)CH_2CH_2CH_2$$

The filtrate is set aside for further work and it is designated as Solution A. The compound is dissolved in 100 ml. of $CH_3CN$ and the solution is filtered into 400 ml. of ethanol. The precipitate is isolated and dried under reduced pressure.

The ultraviolet spectrum of the compound in acetonitrile solution shows maximum absorption at 219mμ ($\epsilon$=15,600).

*Anal.*—Calc'd for $$B_{12}H_{10} \cdot 2CH_3NC(O)CH_2CH_2CH_2$$

B, 38.4; C, 35.5; N, 8.3. Found: B, 37.80; C, 35.50; N, 8.27.

An aqueous solution of $(C_2H_5)_4NOH$ is added to solution A, obtained above, and

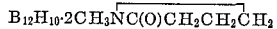
$$(C_2H_5)_4NB_{12}H_{11} \cdot CH_3NC(O)CH_2CH_2CH_2$$

precipitates. It is separated and purified by crystallization from hot water.

(B) A reaction vessel is charged with the dihydrate of $Na_2B_{12}H_{12}$, N-methyl-2-pyrrolidone and concentrated hydrochloric acid. The mixture is filtered and the filtrate is refluxed for 2 hours at 210° C. and it is then poured into water. A white precipitate forms which is separated by filtration, washed and dried. The product is bis(N-methyl-2-pyrrolidone)decahydrododecaborane(10), i.e., a compound of the formula

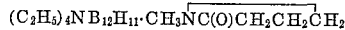
$$B_{12}H_{10} \cdot 2(CH_3N-C(O)CH_2CH_2CH_2)$$

The identity of the compound is confirmed by its infrared absorption spectrum.

The filtrate from the above reaction mixture is separated into two portions. To one portion an aqueous solution of $(CH_3)_4NCl$ is added with stirring. The precipitate which forms is separated, washed and dried to yield

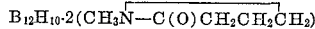
$$(CH_3)_4NB_{12}H_{11} \cdot CH_3NC(O)CH_2CH_2CH_2$$

as a white crystalline product.

To the second portion of the filtrate an aqueous solution of $(C_2H_5)_4NOH$ is added with stirring. The white precipitate which forms is separated, washed and dried to yield $$(C_2H_5)_4NB_{12}H_{11} \cdot CH_3NC(O)CH_2CH_2CH_2$$

The identity of the tetraalkylammonium salts is confirmed by their infrared absorption spectra.

(C) A mixture is prepared which consists of 20 g. of $Na_2B_{12}H_{12} \cdot 2H_2O$, 200 ml. of N-methyl-2-pyrrolidone and 25 ml. of concentrated aqueous hydrochloric acid. The mixture is filtered to remove NaCl and the filtrate is heated to boiling to remove water until the pot temperature is 180° C. The mixture is refluxed for 3 hours at 180° C., cooled and allowed to stand about 20 hours. It is then poured into 600 ml. of $C_2H_5OH$ and the solution which forms is added to a solution of 15 g. of CsOH in 200 ml. of $C_2H_5OH$. A precipitate forms and it is separated by filtration. The product is crystallized from water to obtain 5.7 g. of

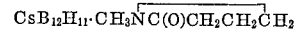
$$CsB_{12}H_{11} \cdot CH_3NC(O)CH_2CH_2CH_2$$

*Analysis.*—Calc'd for

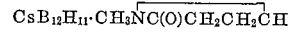
$$CsB_{12}H_{11} \cdot CH_3NC(O)CH_2CH_2CH$$

Cs, 35.6; B, 34.8; C, 16.1; H, 5.4; N, 3.8. Found: Cs, 32.6; B, 34.4; C, 15.3; H, 5.8; N, 3.9.

The process of Example 1 is generic to the preparation of compounds of Formula 1 where Z is an amide of a carboxylic acid. The process, as illustrated, employs a salt of $B_{12}H_{12}^{-2}$ anion in the presence of a strong mineral acid to prepare the dodecahydrododecaboric acid in situ. The acid or its hydrates, e.g. $(H_3O)_2B_{12}H_{12} \cdot nH_2O$, where $n$ generally has a value of 4–18, can be employed directly. To illustrate, the hydrated boron-containing acid is reacted with $CH_3C(O)N(CH_3)_2$ to obtain $$B_{12}H_{10} \cdot 2CH_3C(O)N(CH_3)_2$$

and, further with $NH_4OH$ to obtain $$NH_4B_{12}H_{11} \cdot CH_3C(O)N(CH_3)_2$$

$Na_2B_{12}H_{12}$ (or any alkali metal salt of $B_{12}H_{12}^{-2}$) is reacted with $C_6H_5C(O)N(C_8H_{17})_2$, in the presence of HCl to obtain $B_{12}H_{10} \cdot 2C_6H_5C(O)N(C_8H_{17})_2$, and further with $(CH_3)_3SOH$ to obtain $$(CH_3)_3SB_{12}H_{11} \cdot C_6H_5C(O)N(C_8H_{17})_2$$

and $(NH_4)_2B_{12}H_{12}$ is reacted with

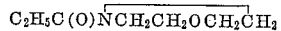
$$C_2H_5C(O)NCH_2CH_2OCH_2CH_2$$

in the presence of HCl to obtain

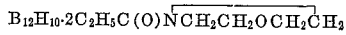
$$B_{12}H_{10} \cdot 2C_2H_5C(O)NCH_2CH_2OCH_2CH_2$$

and further with tributylamine to obtain

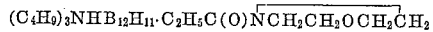
$$(C_4H_9)_3NHB_{12}H_{11} \cdot C_2H_5C(O)NCH_2CH_2OCH_2CH_2$$

and $(NH_4)_2B_{12}H_{12}$ is reacted with $HC(O)N(CH_3)_2$, preferably under pressure, to obtain $B_{12}H_{10} \cdot 2HC(O)N(CH_3)_2$ and further with $(CH_3)_4NCl$ to obtain $$(CH_3)_4NB_{12}H_{11} \cdot HC(O)N(CH_3)_2$$

EXAMPLE 2

(A) A reaction vessel is charged with 1.6 g. of a hydrate of dihydrogen dodecahydrodecaborate of the approximate composition $(H_3O)_2B_{12}H_{12} \cdot 5H_2O$, and 18 g. of tetrahydrothiophene-1,1-dioxide. The mixture is stirred to form a clear solution. The reaction vessel is then connected to a vacuum pump and pressure in the vessel is reduced to a very low value (less than 1.0 mm. of Hg). The solution, at prevailing atmospheric temperature (about 25° C.), gradually evaporates with removal at first of water vapor. Removal of water from the solution is followed by observing the intensity of the infrared absorption band for water (2.8μ) on an aliquot portion of the reaction mixture. As evaporation proceeds, the intensity of absorption at 2.8μ becomes very weak and the solution begins to evolve hydrogen. Evaporation under reduced pressure at atmospheric temperature is continued until evolution of hydrogen subsides. The clear residue is dissolved in about 100 ml. of water to form a clear solution which is divided into two portions, each of which are, of course, acidic. One portion is neutralized with a concentrated aqueous solution of CsOH and the second portion is neutralized with an aqueous solution of $$(CH_3)_4NOH$$

In each case a precipitate forms which is separated by filtration, washed and recrystallized from boiling water. The products are compounds of the formulas

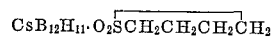
$$CsB_{12}H_{11} \cdot O_2SCH_2CH_2CH_2CH_2$$

and $(CH_3)_4NB_{12}H_{11}\cdot O_2\overline{SCH_2CH_2CH_2C}H_2$

The identities of the compounds are confirmed by elemental analyses and by their infrared absorption spectra.

*Analysis.*—Calc'd for the Cs salt: Cs, 33.7; B, 32.95; C, 12.2; H, 4.86; S, 8.14. Found: Cs, 32.2; B, 32.64; C, 11.62; H, 5.05; S, 8.36.

*Analysis.*—Calc'd for the $(CH_3)_4N$ salt: N, 4.18; B, 38.75; C, 28.65; H, 9.33; S, 9.56. Found: N, 4.14; B, 38.36; C, 29.25; H, 9.45; S, 9.56.

The infrared absorption spectrum of the Cs salt shows strong absorbtion at $4.1\mu$ (B-H stretch) and weaker absorption at 7.7, 7.8, 7.95, 8.1, 8.9, 9.1, 9.3, 9.5, 9.75, 9.9, 10.1, 11.0, 11.8, 11.9, and $13.25\mu$.

The infrared absorption spectrum of the tetramethylammonium salt shows absorption at all of the above bands for the cesium salt and, in addition, shows absorption at 10.5, 12.7, and $14.0\mu$.

(B) A quantity (0.11 g.) of $CsB_{12}H_{11}\cdot O_2\overline{S CH_2CH_2CH_2C}H_2$ is dissolved in sufficient hot water to form a clear solution which is passed through a column filled with a commercial ion-exchange resin of the crosslinked polystyrenesulfonic acid type. The aqueous effluent is a solution of the free acid, represented in its hydronium form as $(H_3O)B_{12}H_{11}\cdot O_2\overline{S CH_2CH_2CH_2C}H_2$ or, alternatively, as a hydrate of $HB_{12}H_{11}\cdot O_2\overline{S CH_2CH_2CH_2C}H_2$ The aqueous effluent is titrated to a pH value of 7 with a 0.1 N aqueous solution of sodium hydroxide to obtain an aqueous solution of $NaB_{12}H_{11}\cdot O_2\overline{S CH_2CH_2CH_2C}H_2$ The equivalent weight of the salt employed as the initial reactant, i.e., $CsB_{12}H_{11}\cdot O_2\overline{S CH_2CH_2CH_2C}H_2$ is thus determined to be 393 (calc'd value, 393).

The free acid can be isolated in crystalline form by evaporation of the aqueous effluent, obtained above, under reduced pressure. It is obtained preferably as a hydrate in which the number of moles of water is determined to a large extent by the duration and intensity of the drying period. For most purposes the acid is handled conveniently in aqueous solution.

The sodium salt, i.e., $NaB_{21}H_{11}\cdot O_2\overline{S CH_2CH_2CH_2C}H_2$ can also be isolated by evaporation of its aqueous solution. It can be obtained as a white crystalline compound, usually with water of hydration.

EXAMPLE 3

A reaction vessel is charged with 1.2 g. of a hydrate of dihydrogen dodecahydrododecaborate of the approximate composition $(H_3O)_2B_{12}H_{12}\cdot 5H_2O$, and 14.3 g. of tetrahydrothiophene-1,1-dioxide, i.e., $O_2\overline{SCH_2CH_2CH_2C}H_2$ The reaction vessel is connected to a vacuum pump and pressure in the vessel is reduced to a value of less than 1.0 mm. of Hg. The solution gradually evaporates and water vapor, which is released from the mixture, is removed. The extent of removal of water is estimated by periodic inspection of the infrared absorption spectrum of the mixture. When removal of water is substantially complete, hydrogen begins to evolve from the solution. The evaporation procedure is maintained at atmospheric temperature until evolution of hydrogen subsides. The mixture, still under reduced pressure, is warmed to 95–100° C. and a further quantity of hydrogen is evolved. After hydrogen evolution at this temperature subsides, the reaction mixture is cooled to atmospheric temperature. The mixture is diluted with water, an oil separates, and methanol is added. The oil changes to a crystalline mass which is separated by filtration. The product is recrystallized from aqueous acetone to obtain bis(tetrahydrothiophene-1,1-dioxide)decahydrododecaborane(10) containing acetone as solvent of crystallization. The identity of the product is confirmed by its infrared absorption spectrum and by elemental analysis.

*Analysis.*—Calc'd for $B_{12}H_{10}\cdot 2O_2\overline{SCH_2CH_2CH_2C}H_2\cdot 2/3(CH_3)_2CO$ B, 31.05; C, 28.85; H, 28.85; H, 7.22; S, 15.32. Found: B, 31.28; C, 28.40; H, 7.37; S, 15.37.

The infrared spectrum of the compound shows absorption at the following wavelengths (expressed as microns): 4.0, 7.8, 8.1, 8.35, 8.45, 8.8, 8.9, 9.1, 9.3, 9.9, 10.0, 10.1, 11..0, and 12.25.

EXAMPLE 4

The procedure of Example 2 is followed employing 1.3 g. of the hydrate of dihydrogen dodecahydrododecaborate and 11.6 g. of di(n-propyl) sulfone, i.e., $(C_3H_7)_2SO_2$. The products obtained are $CsB_{12}H_{11}\cdot O_2S(C_3H_7)_2$ and $(CH_3)_4NB_{12}H_{11}\cdot O_2S(C_3H_7)_2$

*Analysis.*—Calc'd for the Cs salt: C, 31.3; B, 30.6; C, 17.0; H, 5.94; S, 7.56. Found: C, 30.0; B, 30.7; C, 17.25; H, 6.31; S, 7.59.

*Analysis.*—Calc'd for the $(CH_3)_4N$ salt: N, 3.84; B, 35.5; C, 32.9; H, 10.2; S, 8.76. Found: N, 3.95; B, 35.72; C, 32.52; H, 10.02; S, 8.83.

The infrared absorption spectrum of the cesium salt shows absorption at the following principal wavelengths (expressed as microns): 4.0, 7.6, 7.8, 8.06, 8.4, 9.3, 9.4, 9.5, 9.8, 10.25, 11.9, and 13.9. The $(CH_3)_4N$ salt shows a similar infrared absorption spectrum and, further, includes absorption at a wavelength of 10.5.

The process of Examples 2, 3 and 4 is generic to the preparation of compounds of Formula (1) in which Z is a sulfone. To illustrate, hydrated dihydrogen dodecahydrododecaborate can be reacted with (1) diethyl sulfone to obtain $B_{12}H_{10}\cdot 2O_2S(C_2H_5)_2$ and, further, with NaOH to obtain $NaB_{12}H_{11}\cdot O_2S(C_2H_5)_2$, (2) ditolyl sulfone to obtain $B_{12}H_{10}\cdot 2O_2S(C_6H_4CH_3)_2$ and, further, with hydrazine to obtain $NH_2NH_3B_{12}H_{11}\cdot O_2S(C_6H_4CH_3)_2$, (3) with ethyl cyclohexyl sulfone to obtain $B_{12}H_{10}\cdot 2O_2S(C_2H_5)(C_6H_{11})$ and, further, with $(CH_3)_2NNH_2$ to obtain $(CH_3)_2NNH_3B_{12}H_{11}\cdot O_2S(C_2H_5)(C_6H_{11})$ and (4) butyl naphthyl sulfone to obtain $B_{12}H_{10}\cdot 2O_2S(C_4H_9)(C_{10}H_7)$ and, further, with $Zn(NH_3)_4Cl_2$ to obtain $Zn(NH_3)_4[B_{12}H_{11}\cdot O_2S(C_4H_9)(C_{10}H_7)]_2$

EXAMPLE 5

A reaction vessel is charged with 10.4 g. of hydrated dihydrogen dodecahydrododecaborate and 33 g. of N,N-diethyl-1-hexanesulfonamide. The vessel is connected to a vacuum pump and pressure in the vessel is reduced to a low value (less than 1 mm. of Hg). Water is released from the mixture and it is removed by evaporation. The acid dissolves during this step to form a clear solution. The components of the mixture can be stirred, if desired. The clear solution is heated to 40° C., evolution of hydrogen begins and the mixture is maintained at 40° C. until gas evolution subsides. The mixture at this point will be referred to as Solution A.

A portion (5.8 g.) of Solution A is added to about 20 ml. of ethyl alcohol and a sufficient quantity of an aqueous solution of $(CH_3)_4NOH$ is added to make the mixture basic. About 20 ml. of water is added to the reaction mixture and a white precipitate forms. The product is separated by filtration, washed and recrystallized from water to obtain tetramethylammonium (N,N-diethyl-1-hexanesulfonamide)undecahydrododecaborate(—1). The identity of the compound is confirmed by its infrared absorption spectrum and by elemental analysis.

*Analysis.*—Calc'd for

B, 29.8; N, 6.43; S, 7.35; C, 38.6; H, 10.7. Found, B, 29.73; N, 6.38; S, 7.27; C, 38.39; H, 10.57.

A second 5.8 g. portion of Solution A is reacted with an aqueous solution of CsOH and the resulting solution is processed as described in the preceding paragraph to obtain cesium (N,N-diethyl-1-hexanesulfonamide)undecahydrododecaborate(—1).

*Analysis.*—Calc'd for $CsB_{12}H_{11} \cdot C_6H_{13}SO_2N(C_2H_5)_2$: Cs, 26.8; B, 26.2; N, 2.82; S, 6.46; C, 24.2; H, 6.92. Found: Cs, 26.1; B, 25.2; N, 2.84; S, 6.28; C, 24.8; H, 7.19.

The infrared spectrum of the cesium salt shows absorption at the following wavelengths (expressed as microns): 4.05, 7.7, 8.6, 9.2, 9.5–10.0, 10.5, 12.0, 12.6, and 13.9.

EXAMPLE 6

A reaction vessel is charged with a few grams (ca. 3 g.) each of a hydrate of dihydrogen dodecahydrododecaborate(—2) and N,N-diethylbenzenesulfonamide. The components are mixed and heated under low pressure (less than 1 mm. of Hg) to 40° C. The mixture melts to a paste and the temperature is raised to 60° C. Hydrogen gas is evolved and the temperature is maintained at 60° C. until evolution of gas subsides. The mixture is cooled to atmospheric temperature, dissolved in ethyl alcohol and neutralized with aqueous CsOH. The precipitate which forms is separated by filtration and crystallized from water to obtain cesium (N,N-diethylbenzenesulfonamide)undecahydrododecaborate(—1).

*Analysis.*—Calc'd for $CsB_{12}H_{11} \cdot (C_2H_5)_2NS(O)_2C_6H_5$: B, 26.65; N, 2.88; S, 6.58; C, 24.65; H, 5.38; Cs, 27.1. Found: B, 24.64; N, 3.04; S, 7.04; C, 22.71; H, 5.73; Cs, 26.3.

Operation of the process illustrated in Examples 5 and 6 at a temperature of about 90–100° C. permits the preparation of the non-ionic species of Formula 3. To illustrate, heating of the reaction mixture of Example 5 to about 100° C. will yield $B_{12}H_{10} \cdot 2C_6H_{13}SO_2N(C_2H_5)_2$; heating the reaction mixture of Example 6 to the same temperature will yield $B_{12}H_{10} \cdot 2C_6H_5SO_2N(C_2H_5)_2$.

The process of Examples 5 and 6 is generic to the preparation of compounds of Formula 1 where Z is a sulfonamide. To illustrate, hydrated dihydrogen dodecahydrododecaborate can be reacted with (1) N,N-dimethylethanesulfonamide to obtain $B_{12}H_{10} \cdot C_2H_5SO_2N(CH_3)_2$ and, further, with $(CH_3)_3C_6H_5CH_2NOH$ to obtain $(CH_3)_3C_6H_5CH_2NB_{12}H_{11} \cdot C_2H_5SO_2N(CH_3)_2$ (2) with N-pentamethylenecyclohexanesulfonamide to obtain

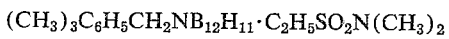

and, further, with $Ca(OH)_2$ to obtain

and (3) with N,N-dibutyl cyclobutanesulfonamide to obtain $B_{12}H_{10} \cdot 2C_4H_7SO_2N(C_4H_9)_2$ and, further, with N-methylquinoline to obtain N-methylquinolinium

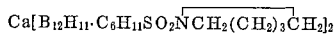

Utility

The compounds of the invention are useful in many diverse fields. All of the compounds represented by Formula 1 are generically useful as combustible components of fireworks compositions to impart a pleasing color and sparkle to the display.

The compounds of the invention are generically useful as impregnating agents for cellulosic products in the preparation of resistors. To illustrate, lengths of cotton string are immersed in (1) a nearly saturated acetone solution of

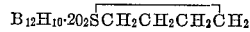

and (2) an aqueous acetone solution of

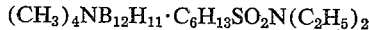

The lengths of string are withdrawn from the solutions and solvents are removed by air-drying. A free flame is applied to each of the dried strings and they burn freely. The residues from the impregnated strings, after burning, have a size and shape similar to the original section of string and the residual skeleton is of sufficient coherence to permit embedding in paraffin. The sections of residue, so treated, show resistances of about 11,300 ohms/inch and about 25,000 ohms/inch, respectively. The residue from a control unimpregnated section of string is very small and shapeless and it cannot be handled.

In the group of compounds which fall within the scope of Formula 2, the component M represents a range of groups which are readily interchangeable by metathetic reactions as described earlier. Thus, all of the salts can be used as intermediates in the preparation of acids which are represented generically as $HB_{12}H_{11} \cdot Z$, where Z is defined as in Formula 1, or in aqueous solution as $(H_3O)B_{12}H_{11} \cdot Z \cdot nH_2O$, by passing aqueous or alcoholic solutions of the salts through an acidic ion-exchange resin as described earlier. The acids of this group are very strong acids and they are useful in industrial applications where it is desired to avoid contamination from sulfate, chloride, bromide, chlorate, phosphate, and like strong acid anions. Thus, the acids of Formula 2, where M is H or $(H_3O)+$ are useful for etching metals, such as steel, and for rust removal, for pickling, for scale removal and for similar metal processing operations.

The acids are useful as catalysts in the preparation of esters, e.g., in the reaction of alcohols and carboxylic acids, to improve the yields of the desired esters. The acids of this invention are employed for this purpose in the same manner as p-toluenesulfonic acid, sulfuric acid or alcoholic hydrogen chloride.

The compounds of Formula 4 are generically useful in the fields of application described above for the compounds of Formula 1.

As many apparently widely different embodiments of this invention may be made without departing from the spirit and scope thereof, it is to be understood that this invention is not limited to the specific embodiments thereof.

The embodiments of the invention in which an exclusive property or privilege is claimed are defined as follows:

1. A compound of the formula

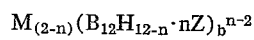

wherein M is a cation; $n$ is a cardinal number of from 1 to 2, inclusive; $b$ is at least 1 and is otherwise equal to the valence of M; and Z is selected from the class consisting of

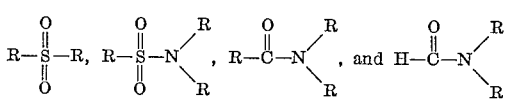

wherein each R taken separately is a monovalent hydrocarbyl group of up to 18 carbon atoms free of aliphatic ethylenic and acetylenic carbon-to-carbon bonds, and wherein any two R groups taken together represent a divalent member of the class consisting of (a) alkylene of up to a total of 5 carbon atoms and (b)

—CH₂CH₂OCH₂CH₂—

2. A compound of claim 1 wherein $n$ is 1.
3. A compound of claim 1 wherein $n$ is 2.
4. A compound of claim 1 containing water of hydration.
5. A compound of claim 1 wherein the R groups each are monovalent hydrocarbyl groups of up to 18 carbon atoms free of aliphatic ethylenic acetylenic carbon-to-carbon bonds.
6. $B_{12}H_{10} \cdot 2CH_3NC(O)CH_2CH_2CH_2$. 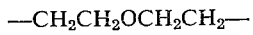
7. $CsB_{12}H_{11} \cdot CH_3NC(O)CH_2CH_2CH_2$. 
8. $(CH_3)_4NB_{12}H_{11} \cdot O_2SCH_2CH_2CH_2CH_2$. 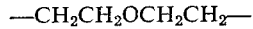
9. $CsB_{12}H_{11} \cdot C_6H_{13}SO_2N(C_2H_5)_2$.
10. $CsB_{12}H_{11} \cdot (C_2H_5)_2NS(O)_2C_6H_5$.
11. Process for preparing compounds of the formula $$M_{(2-n)}(B_{12}H_{12-n} \cdot nZ)_b{}^{n-2}$$

wherein M is a cation; Z is a group selected from the class consisting of

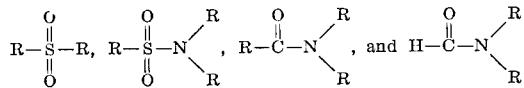

wherein each R taken separately is a monovalent hydrocarbyl group of up to 18 carbon atoms free of aliphatic ethylenic and acetylenic carbon-to-carbon bonds, and wherein any two R groups taken together represent a divalent group of the class consisting of (a) alkylene of up to a total of 5 carbon atoms, and (b)

—CH₂CH₂OCH₂CH₂—

$n$ is a cardinal number of from 1–2, inclusive; and $b$ is at least 1 and is otherwise the valence of M, which comprises reacting at a temperature of from about 40° C. to about 300° C.; a hydrate of $H_2B_{12}H_{12}$ with a compound selected from the class consisting of

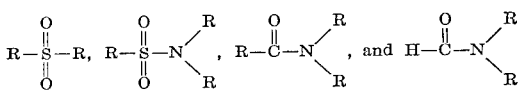

wherein R is defined as above; isolating from the reaction mixture any $B_{12}H_{10} \cdot 2Z$ formed, treating the remaining mixture with a salt whose cation is selected from the class consisting of cesium and tetra(lower alkyl)ammonium, isolating the resulting $M'(B_{12}H_{11} \cdot Z)_b$ wherein M' is the aforesaid cesium and tetra(lower alkyl)ammonium, and subjecting said $M'(B_{12}H_{11} \cdot Z)$ to a metathetical cation exchange reaction to obtain the compound $M(B_{12}H_{11} \cdot Z)$.

12. Process of claim 11 wherein the hydrate of

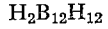

is formed in situ from $Na_2B_{12}H_{12}$ and a strong acid.

References Cited

Karrer, Organic Chemistry, 2nd English ed., pp. 901–902, Elsevier Pub. Co., New York, 1956.

Knoth et al., J. Am. Chem. Soc., vol. 84, pp. 1056–1057 March 20, 1962.

Knoth et al., J. Am. Chem. Soc., vol. 86, pp. 3973–3983 1964.

Rodd, Chemistry of Carbon Compounds, vol. IA Aliphatic Compounds, page 221, Elsevier Pub. Co., New York, 1951.

JOHN D. RANDOLPH, *Primary Examiner.*

C. DON QUARFORTH, *Examiner.*

J. W. WHISLER, *Assistant Examiner.*